Figure 1:
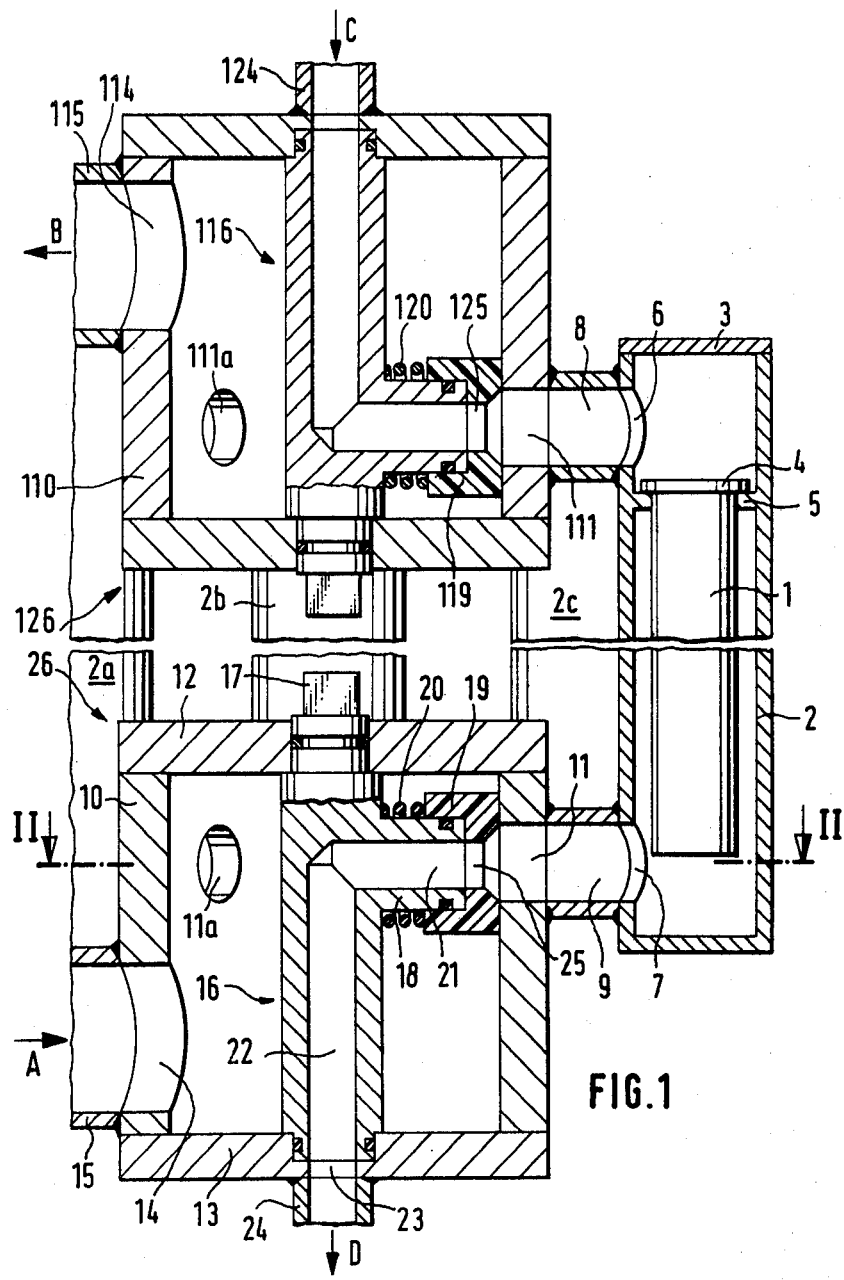

United States Patent [19]

Litzenburger

[11] 4,430,220
[45] Feb. 7, 1984

[54] APPARATUS FOR CONTROLLING FLUID MEDIUM FLOW

[75] Inventor: Wolfgang Litzenburger, Hassloch, Fed. Rep. of Germany

[73] Assignee: Flutec Fluidtechnische Geräte GmbH, Fed. Rep. of Germany

[21] Appl. No.: 403,138

[22] Filed: Jul. 29, 1982

[30] Foreign Application Priority Data

Aug. 7, 1981 [DE] Fed. Rep. of Germany ....... 3131281

[51] Int. Cl.³ .............................................. B01D 29/38
[52] U.S. Cl. ................................. 210/333.1; 210/340; 210/427
[58] Field of Search ................ 210/333.1, 333.01, 334, 210/340, 427

[56] References Cited

U.S. PATENT DOCUMENTS

| | | | |
|---|---|---|---|
| 3,679,060 | 7/1972 | Smith | 210/333.01 |
| 3,944,488 | 3/1976 | Moatti | 210/333.01 |
| 4,352,739 | 10/1982 | Oliver, Jr. et al. | 210/333.1 |

FOREIGN PATENT DOCUMENTS

| | | |
|---|---|---|
| 516045 | of 1930 | Fed. Rep. of Germany . |
| 1960566 | of 1971 | Fed. Rep. of Germany . |
| 1761437 | of 1971 | Fed. Rep. of Germany . |
| 2529229 | of 1977 | Fed. Rep. of Germany . |
| 982425 | of 1965 | United Kingdom . |
| 1039326 | of 1966 | United Kingdom . |
| 1071310 | of 1967 | United Kingdom . |
| 1331185 | of 1973 | United Kingdom . |
| 1395983 | of 1975 | United Kingdom . |
| 2046115 | of 1980 | United Kingdom . |

OTHER PUBLICATIONS

Wlb "Wasser, luft und betrieb", Jul.-Aug. 1979, p. 16, (Dinglinger)

*Primary Examiner*—John Adee
*Attorney, Agent, or Firm*—Roylance, Abrams, Berdo & Goodman

[57] ABSTRACT

A device for selective channeling flow of either one or two fluids to at least one flowthrough element, particularly for the flushing out of a filter having at least one hollow cylindrical filter element in a housing which has two connection holes for the input and discharge of the fluid, and a hollow rotary valve connected with the flowthrough element and with a secondary discharge. A mouthpiece is urged by a spring into connection with the flowthrough element. The rotary valve and each of the flowthrough elements has its own housing part. The mouthpiece of the rotary slide valve can be selectively brought into connection with one of the element connections.

4 Claims, 2 Drawing Figures

APPARATUS FOR CONTROLLING FLUID MEDIUM FLOW

This invention relates to an apparatus for controlling fluid flow, and especially flow through filter elements, wherein the control includes that of selectively flushing and cleaning the filter elements.

BACKGROUND OF THE INVENTION

With a known device of this type, which is described in the publication "WlB 'wasser, luft und betrieb'" 7-8/79, p. 16, the filter elements are mounted in a common housing on a common filter carrier plate, which has filter connections connected here and there with the inside of each filter element. The orifice of a rotary valve can be brought into connection as desired wiith one of the filter connections in the filter carrier plate. This device has a complicated structure and is difficult to service, since it must be completely dismantled for servicing.

One known hoist device for power vehicles, shown in German patent No. 516,045, has a rotary slide valve constructed as a switching valve and a valve housing surrounding this slide valve with a plurality of radial boreholes. The lengthwise borehole in the switching valve can be brought into connection with one of the radial boreholes in the housing as desired through a radial borehole in the switching valve. The axial borehole of the switching valve can be brought into communication with any other radial borehole in the housing by turning the valve element.

BRIEF DESCRIPTION OF THE INVENTION

An object of the present invention is to disclose a simple construction of a fluid handling device which can be serviced at low cost.

Briefly described, the invention includes an apparatus for controlling the flow of at least one fluid through a flow through element comprising a first hollow housing having an inlet opening for delivering fluid thereto and a plurality of outlet openings; means for supplying fluid under pressure to said inlet opening of said first housing; a plurality of second hollow housings, each capable of receiving a flowthrough element, each of said second housings having a conduit connected to receive fluid from one of said outlet opening of said first housing, and having an outlet opening; a rotary valve in said first housing having a valve element selectively connectible to any one of said plurality of outlet openings, and a discharge opening; and means for receiving fluid under pressure from said second housings; whereby when said rotary valve is connected to a selected one of said plurality of outlet openings a fluid flow path is established to said discharge opening, causing flow in the reverse direction through the one of said second housings connected to said selected outlet opening.

Since the rotary valve and each of the flowthrough elements has its own housing part, and the flowthrough element can even be a housing element in and of itself, the structure is very easily understandable and its individual parts are separately easily accessible. Because of the simple structure, the cost of servicing is very low. When it is desired to form a device for flushing out the filter element, it is possible to use a different medium from the filtered medium for the flushing.

Figure 2:
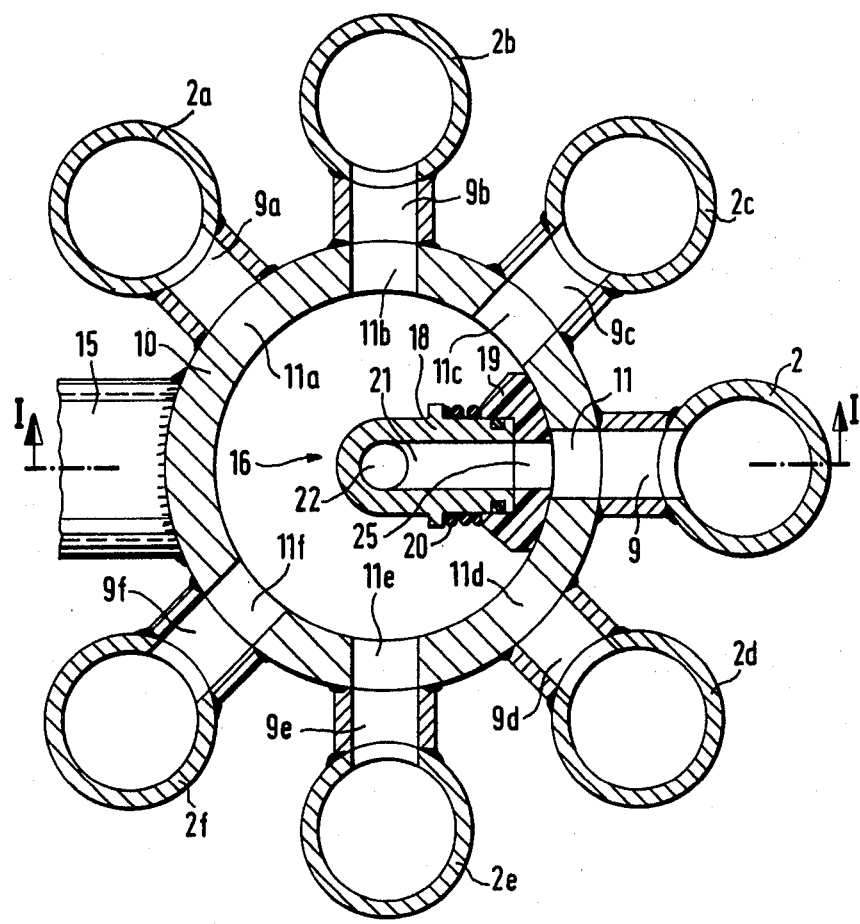

In order that the manner in which the foregoing and other objects are attained in accordance with the invention can be understood in detail, a particularly advantageous embodiment thereof will be described with reference to the accompanying drawings, which form a part of this specification, and wherein:

FIG. 1 is a side elevation, in section, of an apparatus according to the invention, the section being along line I—I of FIG. 2; and FIG. 2 is a plan view, in section, along line II—II of FIG. 1.

In the drawings a device for the flushing out of a filter having seven filter elements is shown as an exemplary embodiment of the invention.

The filter has a plurality of hollow, cylindrical, slightly tapered, filter elements 1, each of which is inserted separately in one of housing parts 2, 2a, . . . 2f (FIG. 2). Each of these housing parts has closed bottom and a removable cover 3 at the top through which the contained filter element 1 is accessible. Each filter element is suspended in its housing by a collar 4 which projects radially outwardly from the upper end of the filter and rests on a flange 5 which projects radially inwardly from the inner wall of each of housing parts 2-2f. Each of housing parts 2-2f has an upper radial borehole 6 and a lower radial borehole 7 near the top and bottom, respectively, the boreholes being connected respectively to tubular elements 8, 9, 8a, 9a, . . . 8f, 9f, which are welded onto housing parts 2-2f.

The other end of each of the tubular elements 9-9f is connected to a hollow, central cylindrical valve housing 10 having a circular cross section, each element being aligned with one of boreholes 11, 11a, . . . 11f which serve as filter connections. The central axes of boreholes 11-11f are arranged at the same level, i.e., they lie in the same transverse plane. Valve housing 10 is covered at the top with a cover 12 and at the bottom with a base plate 13. An inlet borehole 14 is axially offset from the plane containing boreholes 11-11f, is diametrically opposite borehole 11, and is of larger diameter than any of boreholes 11-11f. Connection borehole 14 is in connection with a tubular element 15 which is welded onto valve housing 10.

Within valve housing 10 is a rotary valve 16 which has an axially extending portion rotatably mounted at its ends in cover 12 and base plate 13, respectively, with both of the mounting points being sealed.

The end 17 of the rotary valve which protrudes through cover 12 is formed with a square shape for engagement of a tool to rotate valve 16. Valve 16 has a tubular radial projection 18, on the end of which is slidably mounted a mouthpiece. A compression coil spring 20 is compressed between rotary valve portion 16 and mouthpiece 19, urging the moutpiece against the wall of valve housing 10. Projection 18 has an interior bore 21, which opens into an interior bore 22 in rotary valve 16, which bore opens to the outside in the area of base plate 13. A borehole 23, to which is connected a tubular element 24, is provided at the end of bore 22. Mouthpiece 19 has a hole 25 which tapers outwardly from the diameter of bore 21 to the diameter of the boreholes 11-11f and works with only one of these boreholes at a time. Borehole 25 is not connected to borehole 14 at any time.

Another valve housing 110 is arranged in mirror image to and coaxially with the first valve housing 10, housing 110 also containing a rotary valve 116 arranged in mirror image to rotary slide valve 16. Housing 110 also has a number of boreholes 111 corresponding to the number of filter housings 2-2f, each of which is connected to a radial tubular element 8. Housing 110 also has a connection borehole 114 axially offset from borehole 111. Valve 126 at the top in the drawing corresponds in mirror image to bottom valve 26, of which the corresponding parts in valves 26 and 126 differ by the number 100. As shown in FIG. 2, seven identical housing parts 2–2f, are arranged around both valves 26 and 126. Each housing 2–2f is connected with valve housing 10 and, through the seven tubular elements 8 and boreholes 111, with valve housing 110. Each of the housing parts 2a–2f carries a filter element 1a–1f corresponding to filter element 1, the other elements not being shown.

The medium to be filtered (liquid or gas) passes in the direction of the arrow A through tubular element 15 into valve housing 10 and flows through holes 11a–11f into filter housings 2a–2f. The medium flows through at least six of the seven filter elements 1–1f arranged in these housing parts from the outside to the inside. The filtered medium then passes through tubular elements 8 mounted at the top of housing parts 2a–2f and through boreholes 111 in valve housing 110 and flows out through hole 114 and tubular element 115 in the direction of the arrow B. The medium to be filtered therefore flows through all filter elements of the device with the exception of filter element 1 when the rotary valve is positioned as shown in the drawing. This filter element is flushed out when rotary valves 116 and 16 are in the positions shown, and a flushing medium (liquid or gas) flows in the direction of arrow C through tubular element 124, through rotary valve 116 of valve 126, through tubular element 8 into housing part 2 and through filter element 1 from the inside outward, i.e. in the opposite direction from the flow of the medium to be filtered. Dirt particles are thus removed from filter element 1, carried through tubular element 9, through rotary valve 16 in valve 26 and through tubular element 24 in the direction of arrow D. If it is desired that rotary valves 16 and 116 be in the same position, they are connected tightly with each other. With stepped rotation of rotary valves 16, 116 for the connection to, e.g., another housing part 2a, filter element 1a found therein can be flushed out, whereas filter element 1 which was flushed out beforehand is then in the flow of the medium to be filtered. In this manner, all of the filter elements 1 can be successively and sequentially flushed out in each of the housing parts 2a to 2f while other elements are in a filtering mode. If none of the filter elements 1 are being flushed out, then both rotary valves 16 and 116 are placed in positions 180° offset from that in FIG. 2, wherein holes 25 and 125 are closed by the inner surface of valve housing 10 and 110, respectively.

The filter elements can be flushed out either in a certain time frame or after a certain pressure in one of the housing parts 2 to 2f has been reached because of dirt accumulation.

The loss of medium to be filtered is minimized if the two rotary valves 16 and 116 are rotated in proper timing relationship to each other. Thus borehole 111 is first connected in valve housing 110 with rotary valve 116. Then the medium remaining in filter housing 1 is pushed back into valve housing 26 by means of a gas fed in the direction of arrow C. Finally, borehole 11 in valve housing 10 is also connected with rotary valve 16, as shown in the drawing. Filter element 1 is finally flushed out with a flushing agent flowing in the direction of arrows C, D.

If the filters are to be flushed out using the fluid medium being filtered, then rotary slide valve 116 of valve 126 can be dispensed with. In the absence of rotary slide valve 116, the medium filtered by the pressure arising in valve housing 110 is fed through tubular element 8 to the inside of filter element 1 and flows through this from the inside to the outside, so that dirt particles accumulated on the filter element are separated out. The medium carrying the direct particles is then, as shown in FIG. 1, carried by rotary slide valve 16 into valve housing 26 in the direction of arrow D.

As a result of the inside excess pressure, no dirt reaches the inside of the device described above. The service is simple. The sole movable part which is used for closing, rotary slide valve 16 and/or 116, can be replaced by opening valve housing 10 and/or 110 in a simple manner.

In case orifice 19, 119 should not fit sufficiently tightly against housing 10, 110, a closure valve operable as desired can be series-connected with tubular element 24.

The invention can also be used with an adsorber, wherein the adsorber elements can be flushed out by a reactor in which a second medium is added to a first medium with a device for sedimentation for the outflow of the sediment through the rotary slide valve, with a whirlpool bed for the immediate loosening up of dirt layers and the like.

While one advantageous embodiment has been chosen to iillustrate the invention it will be understood by those skilled in the art that various changes and modifications can be made therein without departing from the scope of the invention as defined in the appended claims.

What is claimed is:

1. An apparatus for controlling the flow of at least one fluid through a flowthrough element such as a filter comprising
    a first hollow housing having a circularly cylindrical interior, an inlet opening for delivering fluid thereto and a plurality of outlet openings lying in substantially the same plane perpendicular to the axis of said cylindrical interior, said inlet opening being axially offset from said plane; means for supplying fluid under pressure to said inlet opening of said first housing;
    a plurality of second hollow housings, each capable of receiving a flowthrough element,
        each of said second housings having a conduit connected to receive fluid from one of said outlet openings of said first housing, and having an outlet opening;
    a rotary valve in said first housing having
        a discharge opening,
        an axially extending member at least a portion of which is hollow and communicates with said discharge opening, said axially extending member being rotatably mounted in said first housing,
        a radially extending tubular member communicating with said hollow portion of said axially extending member, the axis of said radially extending member lying in the plane containing said outlet openings, and
        a valve element selectively connectable to any one of said plurality of outlet openings, said valve element comprising a mouthpiece on said radially extending member for coupling to a selected outlet opening and spring means urging said mouthpiece toward the interior wall of said first housing; and means for receiving fluid under pressure from said second housing; whereby when said rotary valve is connected to a selected one of said plurality of outlet openings a fluid flow path is established from said means for receiving to said discharge opening, causing flow in the reverse direction through the one of said second housings connected to said selected outlet opening, said reverse direction flow operating to flush contaminates from said filter.

2. An apparatus according to claim 1 wherein said means for receiving fluid includes
   a third hollow housing having an outlet opening and a plurality of inlet openings each connected to normally receive fluid from one of said second housings; and
   a second rotary valve in said third housing having a valve element selectively connectible to any one of said inlet openings.

3. Apparatus according to claim 2 wherein said second rotary valve includes a flushing fluid inlet opening through which a separate flushing fluid can be introduced.

4. An apparatus according to claim 3 wherein second first and second rotary valves are mechanically coupled together for synchronized rotation.

* * * * *